April 4, 1950 L. W. SCHREINER 2,503,073

TELEVISION TUNING SYSTEM

Filed Oct. 8, 1948 2 Sheets-Sheet 1

INVENTOR.
Louis W. Schreiner,
BY
Foorman L. Mueller
Atty.

April 4, 1950 L. W. SCHREINER 2,503,073

TELEVISION TUNING SYSTEM

Filed Oct. 8, 1948 2 Sheets-Sheet 2

INVENTOR.

Louis W. Schreiner,

BY

Forman L. Mueller

Atty.

Patented Apr. 4, 1950

2,503,073

UNITED STATES PATENT OFFICE 2,503,073

TELEVISION TUNING SYSTEM

Louis W. Schreiner, Des Plaines, Ill., assignor to Belmont Radio Corporation, Chicago, Ill., a corporation of Illinois Application October 8, 1948, Serial No. 53,458

17 Claims. (Cl. 250—40)

This invention relates generally to tunable resonant circuits and more particularly to a tuning arrangement which responds to a substantially constant band of frequencies throughout a relatively wide range of frequencies as required for television reception.

In a television receiver, for high quality reception it is necessary that a relatively wide band of frequencies be received. A band of the order of 4½ megacycles is required to receive the video band which may be approximately 4 megacycles and, in addition, a narrow audio band. In order to receive television signals on the various television channels, it is desirable that the circuits be tunable and that the band width remain substantially constant throughout the entire range of frequencies to be received. As television receivers operate at very high frequency, arrangements in which separate circuits are switched for selecting various channels are objectionable in that the lead and switch inductances become material and the variable contact resistance introduced by switching may affect the tuning. For these reasons a continuously tunable system is desirable since lead inductances can be minimized and switching is required only to change bands. Although either variable condensers or variable inductors may be used, circuits using variable iron core inductors have been found more desirable since the inductance values in such circuits are larger facilitating production thereof with the required accuracy. Also, increased gain for the required band pass is realized because the circuit capacity is less at the low frequency end of the range than with capacity tuning.

It is, therefore, an object of the present invention to provide a permeability tuned circuit for a television receiver which provides constant bandwidth throughout a wide range of frequencies.

It is a further object of this invention to provide a simple, continuously tunable, wide band, resonant circuit for use in the very high frequency range.

A still further object of this invention is to provide a wide band, double tuned, resonant circuit in which the coupling between the circuit portions varies in such a way, throughout a wide range of frequencies, that the bandwidth of the resonant circuit remains substantially constant.

A feature of this invention is the provision of a selective circuit for a television receiver including a plurality of resonant circuits having common capacitative and inductive coupling to provide substantially constant pass bandwidth through a wide frequency range.

A further feature of this invention is the provision of a television receiver including permeability tuned, parallel resonant circuits for operation in the low frequency range and permeability tuned, series resonant circuits for operation in the high frequency range.

A still further feature of this invention is the provision of a selective circuit including a plurality of tuned branches having common capacity coupling on the high voltage side and common inductive coupling on the low voltage side. The inductive coupling may be provided by the leads between the resonant circuits and the chassis and in the chassis itself.

Further objects, features and advantages will be apparent from a consideration of the following description when taken in connection with the accompanying drawings in which:

Figs. 3 and 4 are charts showing the response curves of the tuning system.

In practicing the invention there is provided a very high frequency selective circuit as may be used in the radio frequency amplifier of a television receiver. The resonant circuit is of the double tuned type with the two tuned circuits being overcoupled to provide a relatively wide response band and also relatively good selectivity. Each of the circuit portions includes a permeability tuned inductor with the cores thereof being ganged for operation by a common member. In order to retain substantially constant bandwidth throughout a wide frequency range, capacity coupling is provided on the high voltage sides of the circuit portions and inductance coupling is provided on the low voltage sides. The inductive coupling may be provided by the leads from the resonant circuits to the chassis and by the common chassis return. In order to provide operation in two or more ranges of frequency, switch means may be provided for selectively interconnecting various pairs of tuned circuits. The pairs of circuits which are connected at any time are, however, continuously tunable, and as the capacitative and inductive couplings compensate for each other, the bandwidths remain substantially constant throughout each range.

Figures 1, 2:
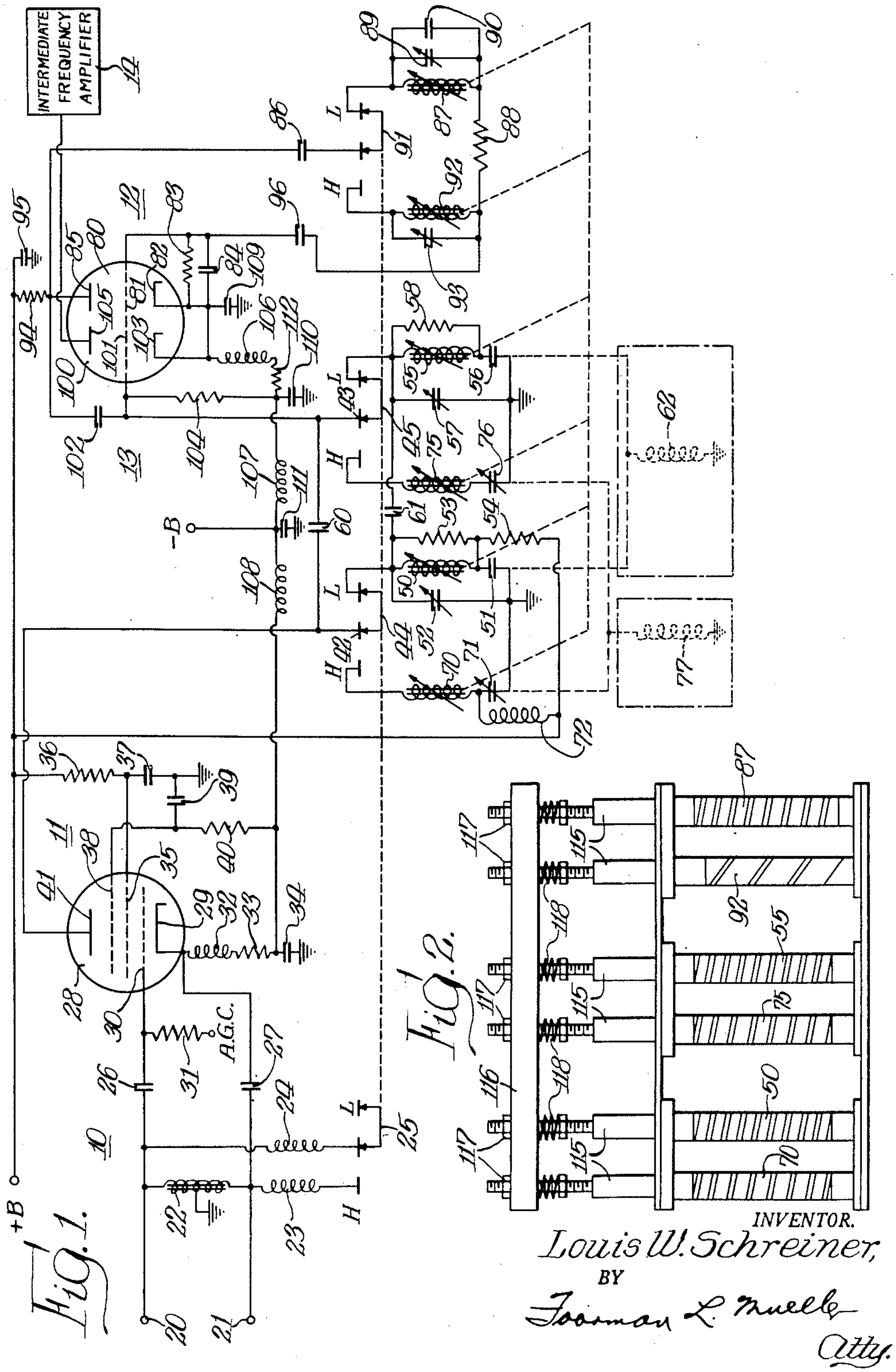
Fig. 1 is a circuit diagram illustrating the improved tuned circuit arrangement in accordance with the invention.
Fig. 2 illustrates the structural configuration of the variable iron core inductors used in the tuning system.
Figure 2:
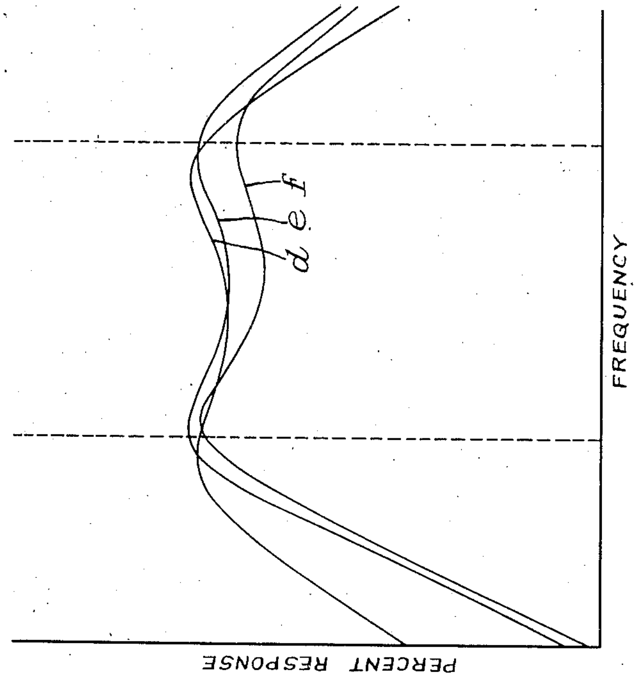

Referring now to the drawings, in Fig. 1 there is illustrated the radio frequency portion of a television receiver which includes an antenna circuit 10, a radio frequency amplifier 11, an oscillator 12, and a mixer 13. The mixer is coupled to an intermediate frequency amplifier 14 which may be of conventional construction and is, therefore, shown in block diagram. The remaining components of the television receiver are not a part of the present invention and, therefore, are not illustrated.

The antenna circuit 10 includes terminals 20 and 21 which may be connected to a wide band antenna for collecting incoming television signals. The incoming signal is applied across inductor 22 which is tuned to the center of the low frequency television band. For operation on the high frequency band inductors 23 and 24 may be connected in series across inductor 22 by the movable switch contact 25. This tunes the input circuit to the center of the high frequency band. The incoming signal is applied through capacitors 26 and 27 to the input electrodes of the tube 28 which functions as a radio frequency amplifier. More specifically, the signal is applied between the cathode 29 and control grid 30 of the tube. Automatic gain control signals may also be applied to the grid 30 through the resistor 31. The cathode 29 is biased by a series circuit including inductor 32, resistor 33, and condenser 34. The tube 28 includes a screen grid 35 connected to +B through resistor 36 and by-passed by capacitor 37 and a suppressor grid 38 which is by-passed to ground by capacitor 39, and coupled to the cathode 29 through resistors 33 and 40 and inductor 32.

The amplified signals appear on plate 41 of the tube 28 and are applied to switch contacts 42 and 43 which may be selectively connected to a plurality of resonant circuits. The movable contacts 44 and 45 are illustrated in position for operation on the low frequency band so that the contact 42 is connected to the tuned circuit including variable inductor 50 connected in series with capacitor 51 and bridged by adjustable capacitor 52. These elements function as a parallel resonant circuit, the frequency of which is adjustable for alignment by capacitor 52, and is variable through a wide range of frequencies by the variable inductor 50. Damping resistor 53 is provided across the inductor 50, and +B potential is applied to the resonant circuit through isolating resistor 54. The contact 43 is connected to a similar resonant circuit including variable inductor 55 in series with capacitor 56 and bridged by adjustable capacitor 57. In this resonant circuit a damping resistor 58 is provided.

For operation on the low frequency band, the resonant circuits of inductors 50 and 55 are capacitatively coupled at the high voltage side by capacitors 60 and 61 in parallel and inductively coupled at the low voltage side by the leads connecting capacitors 51 and 56 to the chassis and by the chassis itself. The inductive coupling is illustrated diagrammatically in Fig. 1 by the inductor 62. It is to be pointed out that this inductor does not exist as a separate physical element but is formed by the proximity of the leads from the capacitors 51 and 56 and by the common chassis portion to which these leads are connected. At the very high frequencies involved, a relatively small inductance provides the impedance required. The proper inductance for any particular circuit can be determined by experiment.

For operation on the high frequency, television band, the switch contacts 44 and 45 are moved to the left. The contact 42 is connected to a series resonant circuit including variable inductor 70 and adjustable capacitor 71. The capacitor 71 is adjustable for aligning the circuit and the inductor 70 is variable to tune the circuit through a wide frequency range. +B potential is applied to this tuned circuit through isolating inductor 72. Contact 43 is connected to a similar resonant circuit including variable inductor 75 and adjustable capacitor 76. The two series resonant circuits are capacitatively coupled at the high voltage side by capacitor 60 and inductively coupled at the low voltage side by the inductance of the leads from capacitors 71 and 76 and the common inductance of the chassis. This is represented schematically in Fig. 1 by the inductor 77.

Figure 3:
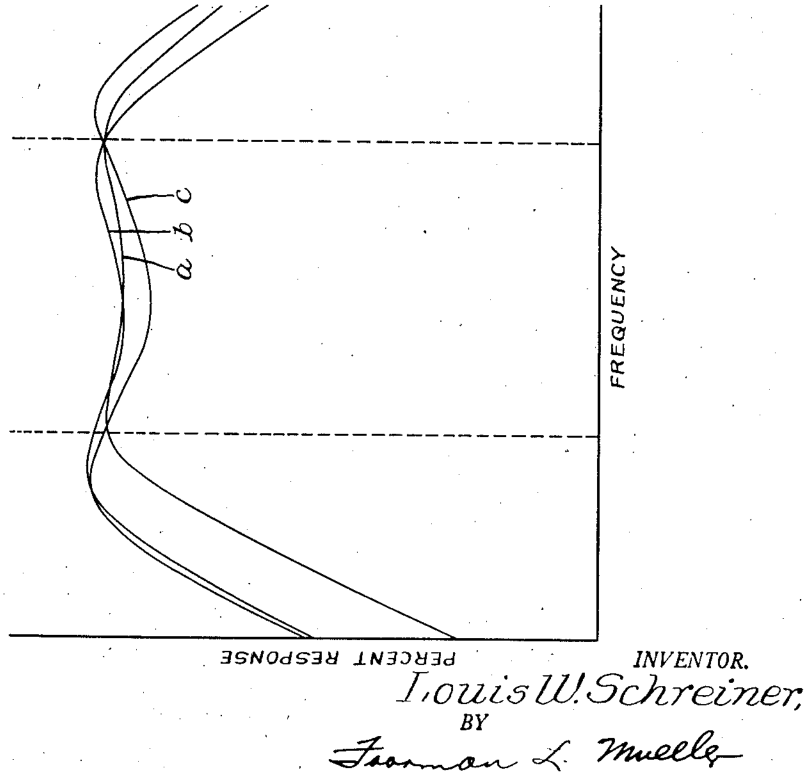

From the above it is seen that for operation on both the low and high frequency television ranges, the two resonant circuits are coupled both inductively and capacitatively. This combination of capacity coupling which varies inversely with frequency and inductive coupling which varies directly with frequency results in overall coupling which varies inversely with frequency and in such manner that the bandwidth remains constant. This is illustrated in Figs. 3 and 4 which show the band pass characteristics of the resonant circuits for various television channels. In Fig. 3, curves *a*, *b* and *c* illustrate the response on channels 2, 4 and 6, respectively, in the low frequency television range, and in Fig. 4, curves *d*, *e* and *f* show the response on channels 7, 10 and 13 respectively, in the high frequency range. It is apparent from the curves that the band pass is substantially constant on all the channels. The signal gain is also relatively constant providing very satisfactory operations.

The oscillator 12 is of the Colpitts type and includes a triode section 80. Feed-back is obtained through tube capacities and through the capacitor 84. The grid 81 is biased with respect to the cathode 82 by resistor 83. Operating potential is applied to the plate 85 through resistor 94 connected to the +B source which is by-passed by capacitor 95. The plate 85 is adapted to be selectively coupled to either of two tank circuits which provide the low and high frequency television bands. For operation on the low band, the plate 85 is connected through capacitor 86 to variable inductor 87, resistor 88, and capacitor 96. The inductor 87 resonates with adjustable capacitor 89 and fixed capacitor 90. For operation of the high band, the switch contact 91 is moved to the left so that the plate 85 of tube 80 is connected through capacitor 86 to the variable inductor 92 and capacitor 96, in series. The inductor 92 is shunted by adjustable capacitor 93. The adjustable capacitors 89 and 93 are provided for aligning the oscillator on the two frequency ranges and the variable inductors 87 and 92 permit tuning the oscillator to the various desired frequencies in either of the two frequency ranges.

The selected output from the radio frequency amplifier and the output from the oscillator are applied to the mixer 13. The mixer includes a triode 100 which may be included in the same envelope with the oscillator triode section 80. The signal from the radio frequency amplifier is applied to the grid 101 of the mixer as well as the signal from the oscillator which is coupled to the grid 101 through capacitor 102. The bias of grid 101 with respect to the cathode 103 is obtained through resistor 104. The output of the mixer, from the plate 105, is applied to the intermediate frequency amplifier where it is further amplified in the usual manner. The cathodes 82 and 103 of the oscillator and mixer sections are common and are biased by inductor 106 and resistor 112 in series, with capacitor 109 providing radio frequency bypass. The cathodes of all the tubes are returned to a —B terminal to permit A. C.-D. C. operation. Inductors 107 and 108 and bypass condensers 34, 110 and 111 isolate the various components.

The variable inductors 50, 55, 70, 75, 87 and 92 may be of the permeability tuner type in which a ferro-magnetic core is variably positioned in a coil. The structure of these inductors is shown in Fig. 2. As relatively low inductance values and wide tuning ranges are required, the coils may be formed of ribbons wound on cylindrical forms. The cores 115 are mounted on a common carriage 116 so that the six cores are moved simultaneously. The various circuits may be aligned by adjustment of the position of the cores 115 on the carriage 116 by use of the nuts 117. Springs 118 may be provided to provide a resilient mounting for the cores with respect to the carriage.

By using double tuned circuits, wide response bands are provided with good selectivity. The tuned circuits of each pair are overcoupled to provide substantially uniform response throughout the entire width of each band. Tracking of the various circuits can be obtained by well known manners such as selection of cores having the required permeability and properly spacing the windings. The combined capacitative and inductive coupling of the double tuned radio frequency amplifier circuit provides substantially constant bandwidths throughout both television ranges. The use of series resonant circuits on the high frequency band provides the largest possible inductance values on this band so that the inductors are not so small that production thereof is difficult. On the low frequency band, parallel tuned resonant circuits provide satisfactory operation. Switching is required only when shifting from one television band to another and, therefore, only four movable contacts are required for providing the entire switching operation.

In systems constructed in accordance with the invention the following values have been used and the resulting system was found to be highly satisfactory:

Inductor 22—7 turns #30 wire on 3/8" iron core.
Inductor 23—2" #18 wire.
Inductor 24—2" #18 wire.
Capacitor 26—220 micromicrofarads.
Capacitor 27—220 micromicrofarads.
Tube 28—6BH6.
Resistor 31—100,000 ohms.
Inductor 32—3 microhenries.
Resistor 33—68 ohms.
Capacitor 34—1,000 micromicrofarads.
Resistor 36—1,000 ohms.
Condenser 37—1,000 micromicrofarads.
Condenser 39—1,000 micromicrofarads.
Resistor 40—5,600 ohms.
Inductor 50—11 turns 1/16" copper ribbon wound 1 3/8" long on .228" form.
Condenser 51—1,000 micromicrofarads.
Condenser 52—1–10 micromicrofarads.
Resistor 53—5,600 ohms.
Resistor 54—5,600 ohms.
Inductor 55—11 turns 1/16" copper ribbon wound 1 3/8" long on .228" form.
Capacitor 56—1,000 micromicrofarads.
Capacitor 57—1–10 micromicrofarads.
Resistor 58—10,000 ohms.

Capacitor 60—1 micromicrofarad.
Capacitor 61—.25 micromicrofarad.
Inductor 70—9 turns of 1/8" copper foil wound 1 3/8" long on diam. form .228".
Capacitor 71—1–10 micromicrofarads.
Inductor 72—3 microhenries.
Inductor 75—9 turns of 1/8" copper foil wound 1 3/8" long on diameter form .228".
Capacitor 76—1–10 micromicrofarads.
Tube 80—(1/2) 6J6.
Resistor 83—10,000 ohms.
Capacitor 84—2.5 micromicrofarads.
Capacitor 86—51 micromicrofarads.
Inductor 87—9 turns 3/32" copper ribbon wound 1 3/8" long on diam. form .228".
Resistor 88—5 ohms.
Capacitor 89—1–10 micromicrofarads.
Capacitor 90—7 micromicrofarads.
Inductor 92—4 turns of 1/4" copper foil wound 1 3/8" long on diam. form .228".
Capacitor 93—1–10 micromicrofarads.
Resistor 94—5,600 ohms.
Capacitor 96—51 micromicrofarads.
Tube 100—(1/2) 6J6.
Capacitor 102—2.2 micromicrofarads.
Resistor 104—10,000 ohms.
Inductor 106—3 microhenries.
Resistor 112—220 ohms.
Capacitor 110—1,000 micromicrofarads.

Although one embodiment of the invention has been described, it is obvious that various changes and modifications can be made therein without departing from the intended scope of the invention as defined in the appended claims.

I claim:

1. A frequency selective system adapted to respond to a wide band of frequencies and tunable to a plurality of channels in a wide range of frequencies comprising, a plurality of resonant circuits each including a variable inductor for changing the frequency to which the circuit is resonant, capacitance means coupling said circuits at the high voltage side thereof, and inductance means coupling said circuits at the low voltage side thereof.

2. A frequency selective system adapted to respond to a wide band of frequencies and tunable to a plurality of channels in the very high frequency range comprising a chassis, means on said chassis forming a plurality of resonant circuits, each of said resonant circuits including a variable inductor for changing the frequency to which the circuit is resonant, capacitance means coupling said circuits at the high voltage side thereof, and means connecting said resonant circuits at the low voltage side thereof to said chassis, said connecting means and said chassis being effective to provide inductive coupling between said resonant circuits.

3. A frequency selective system adapted to respond to a wide band of frequencies and tunable to a plurality of channels in the very high frequency range comprising, a chassis, circuit means supported on said chassis forming a plurality of resonant circuits, each of said resonant circuits including a variable inductor having a favorable ferro-magnetic core for changing the frequency to which the circuit is resonant, capacitance means coupling said circuits at the high voltage side thereof, and means connecting said resonant circuits at the low voltage side thereof to said chassis, said connecting means and said chassis being effective to provide inductive coupling between said resonant circuits at the low voltage side thereof.

4. A circuit adapted to respond to a wide band of frequencies and tunable to a plurality of different channels in the very high frequency range comprising, a plurality of tunable resonant circuits, means for overcoupling said resonant circuits including capacitance means coupling said resonant circuits at the high voltage side thereof and inductance means coupling said resonant circuits at the low voltage side thereof, each of said resonant circuits including a variable inductor for changing the frequency to which said circuit is resonant, and common operating means for varying said inductors for selecting any one of said channels.

5. A circuit adapted to respond to a wide band of frequencies and tunable to a plurality of different channels in the very high frequency range comprising, a pair of tunable resonant circuits, capacitance means coupling said resonant circuits at the high voltage side thereof, and inductance means coupling said resonant circuits at the low voltage side thereof, each of said resonant circuits including a variable inductor for changing the frequency to which said circuit is resonant, and common operating means for varying said inductors for selecting any one of said channels, said common operating means being arranged to tune said resonant circuits to the same frequency within the band of frequencies corresponding to the channel selected.

6. A circuit adapted to respond to a wide band of frequencies and tunable to a plurality of different channels in the very high frequency range comprising, a plurality of pairs of tunable resonant circuits, switch means for selectively connecting a pair of said circuits, capacitance means connected to said switch means for coupling said selected circuits at the high voltage side thereof, inductance means coupling said resonant circuits at the low voltage side thereof, each of said resonant circuits including a variable inductor for changing the frequency to which said circuit is resonant, and common operating means for varying said inductors, said switch means and said operating means being effective to select any one of said channels.

7. A circuit adapted to respond to a wide band of frequencies and tunable to a plurality of different channels in the very high frequency range comprising, a chassis, a plurality of pairs of tunable resonant circuits mounted on said chassis, switch means for selectively coupling the pairs of said circuits, capacitance means connected to said switch means for coupling said selected circuits at the high voltage side thereof, means connecting said resonant circuits to said chassis, said connecting means and said chassis providing an inductance coupling between the circuits of each pair, each of said resonant circuits including a variable inductor for changing the frequency to which said circuit is resonant, and common operating means for varying said inductors, said switch means and said operating means being effective to select any one of said channels.

8. In a television receiver adapted to receive a wide band of signals and tunable to a plurality of different channels in a wide range of frequencies, means for selecting one of said channels comprising, a plurality of tunable resonant circuits, common inductance means and common capacitance means coupling said resonant circuits and arranged to provide substantially constant bandwidth throughout said frequency range, each of said circuits including a coil and a ferro-magnetic core movable in said coil, and common means for moving said cores.

9. In a television receiver adapted to receive a wide band of signals and tunable to a plurality of different channels in the very high frequency range, means for selecting one of said channels comprising, a plurality of tunable resonant circuits, common inductance means and common capacitance means coupling said resonant circuits and arranged so that the coupling varies inversely with frequency and the bandwidth is substantially constant throughout said range, each of said circuits including a coil and a ferro-magnetic core movable in said coil, and common means for moving said cores for tuning said resonant circuits to different frequencies within the band of frequencies coresponding to the channel selected.

10. In a television receiver adapted to receive wide band signals and tunable to a plurality of different channels in the very high frequency range, means for selecting one of said channels comprising, a plurality of tunable resonant circuits, each of said circuits including a coil and a ferro-magnetic core movable in said coil, capacitance means common to said resonant circuits at the high voltage side thereof to provide coupling therebetween which varies inversely with frequency, inductance means common to said resonant circuits at the low voltage side for providing coupling which varies directly with frequency, and common means for moving said cores for selecting said one channel.

11. In a television receiver including a chassis having a frequency selective circuit adapted to receive wide band signals and tunable to a plurality of different channels in a wide range of frequencies, means for selecting one of said channels comprising, a plurality of tunable resonant circuits, each of said circuits including a coil and a ferro-magnetic core movable in said coil, capacitance means common to said resonant circuits at the high voltage side thereof to provide coupling which varies inversely with frequency, means connecting said resonant circuits at the low voltage side thereof to said chassis, said connecting means and said chassis providing inductive coupling between said resonant circuits which varies directly with frequency, whereby the bandwidth of said circuits remains substantially constant throughout said frequency range, and common means for moving said cores for selecting said one channel.

12. In a television receiver adapted to receive wide band signals and tunable to a plurality of different channels in a wide range of frequencies, means for selecting one of said channels comprising, a pair of tunable resonant circuits, each of said circuits including a coil and a ferro-magnetic core movable in said coil, means overcoupling said resonant circuits including capacitance means coupling said resonant circuits at the high voltage side and inductance means coupling said resonant circuits at the low voltage side, so that the coupling between said circuits decreases with increasing frequency and the bandwidth thereof is substantially constant throughout said range, and common means for moving said cores for tuning said circuits.

13. A circuit adapted to respond to a wide band of frequencies and tunable to a plurality of different channels in the very high frequency range comprising, a pair of tunable parallel resonant circuits for operation in a first frequency range, a pair of tunable series resonant circuits for operation in a second frequency range, switch means for selectively interconnecting one pair of said circuits, capacitance means connected to said switch means for coupling said selected circuits at the high voltage side thereof, inductance means coupling said resonant circuits at the low voltage side thereof, each of said resonant circuits including a variable inductor for changing the frequency to which said circuit is resonant, and common operating means for varying said inductors, said switch means and said operating means being effective to select any one of said channels.

14. A tuner adapted to respond to a wide band of frequencies and tunable to a plurality of different channels in the very high frequency range comprising, a pair of tunable parallel resonant circuits for operation in a relatively low frequency range, a pair of tunable series resonant circuits for operation in a relatively high frequency range, switch means for selectively interconnecting one pair of said circuits, and coupling means connected to said switch means for providing combined capacity and inductive coupling between said selected circuits so that the bandwidth of said tuner is substantially constant in all said channels in said low and high frequency ranges.

15. A circuit adapted to respond to a wide band of frequencies and tunable to a plurality of different channels in the very high frequency range comprising, a pair of tunable parallel resonant circuits for operation in a relatively low frequency range, a pair of tunable series resonant circuits for operation in a relatively high frequency range, switch means for selectively connecting one pair of said circuits, capacitance means connected to said switch means for coupling said selected circuits at the high voltage side thereof, inductance means coupling said resonant circuits at the low voltage side thereof, each of said resonant circuits including an inductor having a movable iron core for changing the frequency to which said circuit is resonant, and common operating means for said cores, said switch means and said operating means being effective to select any one of said channels.

16. In a television receiver adapted to receive a wide band of signals and tunable to a plurality of different channels in a wide range of frequencies, means for selecting one of said channels comprising, a plurality of tunable resonant circuits, each of said circuits including a variable inductor, common inductance means and common capacitance means coupling said resonant circuits and arranged to provide substantially constant bandwidth throughout said frequency range, and common operating means for varying said inductors.

17. In a television receiver adapted to receive wide band signals and tunable to a plurality of different channels in the very high frequency range, means for selecting one of said channels comprising, a plurality of tunable resonant circuits, each of said circuits including a variable inductor, capacitance means common to said resonant circuits for providing coupling therebetween which varies inversely with frequency, inductance means common to said resonant circuits for providing coupling therebetween which varies directly with frequency, and common operating means for varying said inductors for selecting said one channel.

LOUIS W. SCHREINER.

REFERENCES CITED

The following references are of record in the file of this patent:

UNITED STATES PATENTS

| Number | Name | Date |
|---|---|---|
| 2,113,157 | Landon et al. | Apr. 5, 1938 |